United States Patent
Zhao et al.

(10) Patent No.: US 12,547,228 B2
(45) Date of Patent: Feb. 10, 2026

(54) COMPUTING SYSTEM WITH VERTICAL CLOCK DELIVERY ARCHITECTURE

(71) Applicant: Tesla, Inc., Austin, TX (US)

(72) Inventors: Jin Zhao, San Jose, CA (US); Raghuvir Ramachandran, Los Gatos, CA (US); Shishuang Sun, Cupertino, CA (US); William Chang, Palo Alto, CA (US); Timothy Fischer, Denver, CO (US)

(73) Assignee: Tesla, Inc., Austin, TX (US)

( * ) Notice: Subject to any disclaimer, the term of this patent is extended or adjusted under 35 U.S.C. 154(b) by 54 days.

(21) Appl. No.: 18/683,469

(22) PCT Filed: Aug. 15, 2022

(86) PCT No.: PCT/US2022/040333
§ 371 (c)(1),
(2) Date: Feb. 13, 2024

(87) PCT Pub. No.: WO2023/022981
PCT Pub. Date: Feb. 23, 2023

(65) Prior Publication Data
US 2024/0353905 A1 Oct. 24, 2024

Related U.S. Application Data

(60) Provisional application No. 63/363,076, filed on Apr. 15, 2022, provisional application No. 63/234,962, filed on Aug. 19, 2021.

(51) Int. Cl.
*G06F 1/26* (2006.01)

(52) U.S. Cl.
CPC ..................... *G06F 1/26* (2013.01)

(58) Field of Classification Search
CPC ........................................ G06F 1/26
See application file for complete search history.

(56) References Cited

U.S. PATENT DOCUMENTS

| | | |
|---|---|---|
| 9,330,220 B1 | 5/2016 | Dehkrodi et al. |
| 10,887,892 B2 | 1/2021 | Nasr et al. |
| 11,122,678 B2 | 9/2021 | Krithivasan et al. |
| 11,894,770 B2 | 2/2024 | Sun et al. |

(Continued)

FOREIGN PATENT DOCUMENTS

| | | |
|---|---|---|
| WO | WO 2002/037909 A2 | 5/2002 |
| WO | WO 2020/263413 A1 | 12/2020 |

OTHER PUBLICATIONS

International Search Report and Written Opinion mailed Dec. 1, 2022 in International Patent Application No. PCT/US2022/040333, in 9 pages.

*Primary Examiner* — Jaweed A Abbaszadeh
(74) *Attorney, Agent, or Firm* — Knobbe, Martens, Olson & Bear, LLP

(57) ABSTRACT

Systems and methods of for vertical power and clock delivery are disclosed. In some embodiments, a computing system can include an array of chips comprising a chip and a power delivery module configured to provide a power supply voltage and one or more clock signals to the chip, the power delivery module being positioned vertically relative to the chip, and the chip configured to vertically receive the one or more clock signals from the power delivery module.

20 Claims, 4 Drawing Sheets

(56) References Cited

U.S. PATENT DOCUMENTS

| | | |
|---|---|---|
| 11,973,004 B2 | 4/2024 | Cao et al. |
| 12,326,084 B1* | 6/2025 | Tian ...................... E21B 44/005 |
| 2006/0249859 A1* | 11/2006 | Eiles ....................... H01L 24/94 |
| | | 257/E23.179 |
| 2017/0178986 A1* | 6/2017 | Khan ...................... H01L 23/36 |
| 2021/0090983 A1* | 3/2021 | Lin ......................... H01L 25/50 |
| 2021/0098370 A1* | 4/2021 | Naser .................. H01L 23/5227 |
| 2021/0225708 A1* | 7/2021 | Lee ......................... H01L 25/18 |
| 2022/0384344 A1* | 12/2022 | Chen .................... H01L 23/528 |
| 2022/0418088 A1* | 12/2022 | Maier ................. H01L 23/3735 |
| 2024/0015887 A1 | 1/2024 | Zhao et al. |
| 2024/0061482 A1 | 2/2024 | Krithivasan et al. |

\* cited by examiner

# COMPUTING SYSTEM WITH VERTICAL CLOCK DELIVERY ARCHITECTURE

CROSS-REFERENCE TO RELATED APPLICATIONS

This application is a U.S. national phase application under 35 U.S.C. § 371 of International Application No. PCT/US2022/040333, titled "COMPUTING SYSTEM WITH VERTICAL CLOCK DELIVERY ARCHITECTURE," and filed Aug. 15, 2022, which claims the benefit of U.S. Provisional Application No. 63/234,962, filed Aug. 19, 2021, titled "POWER DELIVERY MODULE," and of U.S. Provisional Application No. 63/363,076, filed Apr. 15, 2022, titled "COMPUTING SYSTEM WITH VERTICAL CLOCK DELIVERY ARCHITECTURE," the disclosures of each of which are incorporated herein by reference in their entirety and for all purposes.

BACKGROUND

Technical Field

This disclosure relates generally to electronic assemblies.

Description of the Related Art

Computing systems can include a plurality of chips and associated electronics such as power delivery modules and clock modules, which may be distributed on a printed circuit board (PCB). Computing density and performance can be limited by routing for power and clock signals, which can take up significant space.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

In some aspects, the techniques described herein relate to a computing system including: an array of chips including a chip; and a power delivery module configured to provide a power supply voltage and one or more clock signals to the chip, the power delivery module being positioned vertically relative to the chip, and the chip configured to vertically receive the one or more clock signals from the power delivery module.

In some aspects, the techniques described herein relate to a computing system, wherein the chip includes: a computing block; one or more input/output blocks; one or more clock signal contacts configured to receive the one or more clock signals from the power delivery module; and one or more power supply contacts configured to receive the power supply voltage from the power delivery module.

In some aspects, the techniques described herein relate to a computing system, wherein the chip includes at least two clock signal contacts.

In some aspects, the techniques described herein relate to a computing system, wherein the one or more clock signals are electrically isolated from the power supply voltage within the power delivery module. 5.

In some aspects, the techniques described herein relate to a computing system, wherein the one or more clock signals are electrically isolated using one or more grounding vias and a ground island.

In some aspects, the techniques described herein relate to a computing system, wherein the one or more clock signals include a differential signal.

In some aspects, the techniques described herein relate to a computing system, wherein the one or more clock signals include a low voltage differential signaling clock signal.

In some aspects, the techniques described herein relate to a computing system, wherein the power delivery module includes at least one crystal oscillator to generate the one or more clock signals.

In some aspects, the techniques described herein relate to a computing system, wherein the chip is configured to convert the one or more clock signals from a differential signal to a single-ended voltage signal.

In some aspects, the techniques described herein relate to a computing system, wherein the computing system is configured to train a neural network.

In some aspects, the techniques described herein relate to a computing system, wherein the array of chips is included in a system on a wafer.

In some aspects, the techniques described herein relate to a computing system, further including a plurality of additional power delivery modules, wherein the array of chips includes a plurality of additional chips, wherein each of the additional chips is aligned with and configured to vertically receive at least one clock signal from a respective one of the additional power delivery modules.

In some aspects, the techniques described herein relate to a computing system including: an array of chips including a chip, and a power delivery module including a crystal oscillator, the power delivery module configured to provide a power supply voltage and a low voltage differential signaling clock signal to the chip, the power delivery module being positioned vertically relative to the chip, and the chip configured to vertically receive the low voltage differential signaling clock signal from the power delivery module, wherein the chip is configured to convert the low voltage differential signaling clock signal to a single-ended signal, and wherein the array of chips is included in a system on a wafer.

In some aspects, the techniques described herein relate to a method of clock delivery, the method including: generating one or more clock signals with a power delivery module that provides a power supply voltage to a chip of a chip array, wherein the power delivery module is positioned vertically relative to the chip; and providing the one or more clock signals from the power delivery module to the chip via one or more electrical connections that extend vertically from the power delivery module to the chip.

In some aspects, the techniques described herein relate to a method, wherein the one or more clock signals include a differential clock signal, and the method further includes converting, by the chip, the differential clock signal to a single-ended clock signal.

In some aspects, the techniques described herein relate to a method, further including routing the single-ended clock signal within the chip in a direction that is generally perpendicular to the one or more electrical connections.

In some aspects, the techniques described herein relate to a method, wherein the differential clock signal is low voltage differential signaling clock signal.

In some aspects, the techniques described herein relate to a method, wherein the generating is performed using at least one crystal oscillator of the power delivery module.

In some aspects, the techniques described herein relate to a method, wherein the chip array is included on a system on a wafer.

In some aspects, the techniques described herein relate to a method, wherein the providing includes providing the one or more clock signal to at least two clock contacts of the chip.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION OF CERTAIN EMBODIMENTS

Figure 1A:
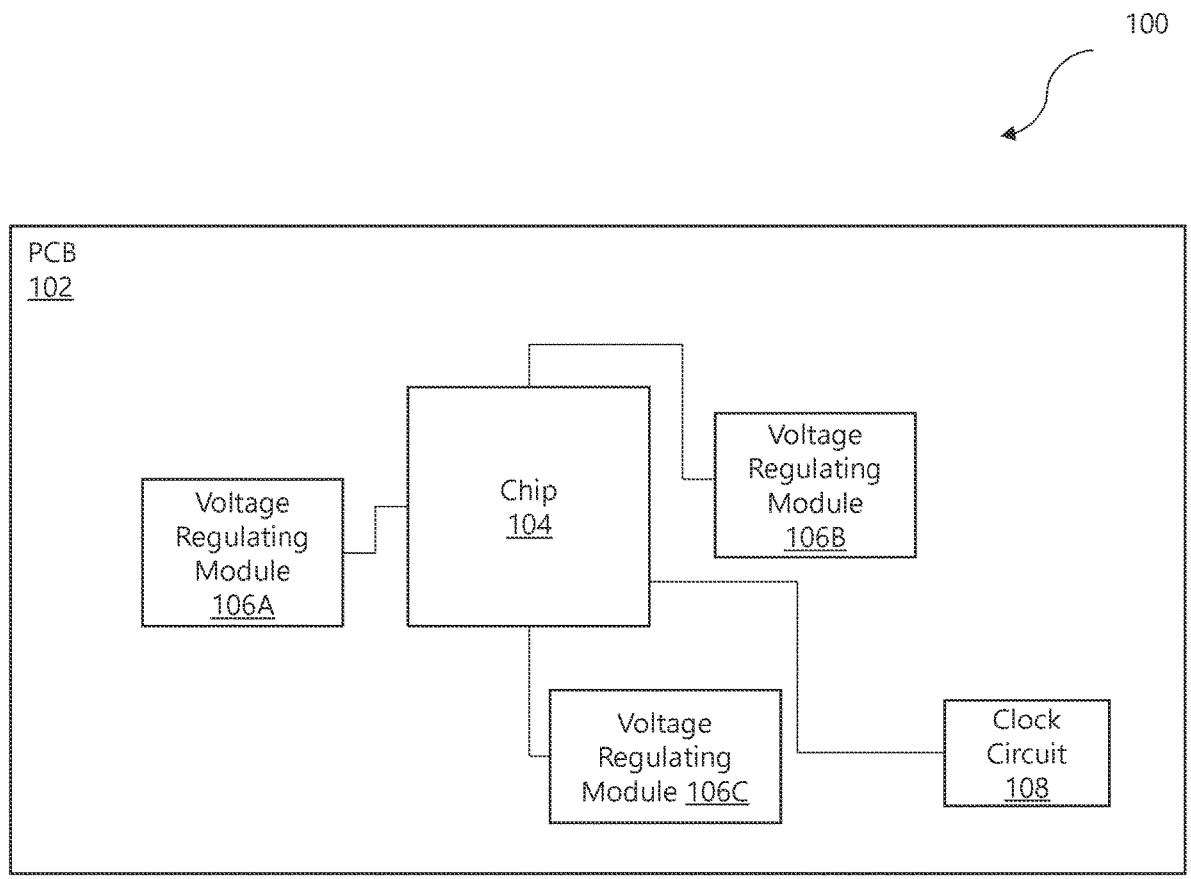
FIGS. 1A and 1B depict an example circuit board layout.

The following description of certain embodiments presents various descriptions of specific embodiments. However, the innovations described herein may be embodied in a multitude of different ways, for example, as defined and covered by the claims. In this description, reference is made to the drawings where like reference numerals may indicate identical or functionally similar elements. It will be understood that elements illustrated in the figures are not necessarily drawn to scale. Moreover, it will be understood that certain embodiments may include more elements than illustrated in a drawing and/or a subset of the elements illustrated in a drawing. Further, some embodiments may incorporate any suitable combination of features from two or more drawings.

Integrated circuit (IC) chips generally use a power supply voltage and a clock signal. The clock signal can be used to synchronize different parts of the chip and to synchronize different chips with one another. A clock signal can be a single-ended signal with a common reference ground shared with other signals. Alternatively, a dedicated reference signal can accompany the clock signal to provide a return path, forming a differential signal as a clock signal. A differential clock signal may have significantly better immunity to noise sources that may be present in and/or around a chip (e.g., switching noise and/or electromagnetic interference) than a single-ended clock signal. Therefore, a cleaner clock signal can be delivered to the IC chip using a differential clock signal. In some embodiments, a low voltage differential signaling (LVDS) signal is a differential, low power signal and can be used to transmit a clock signal.

Figure 1B:
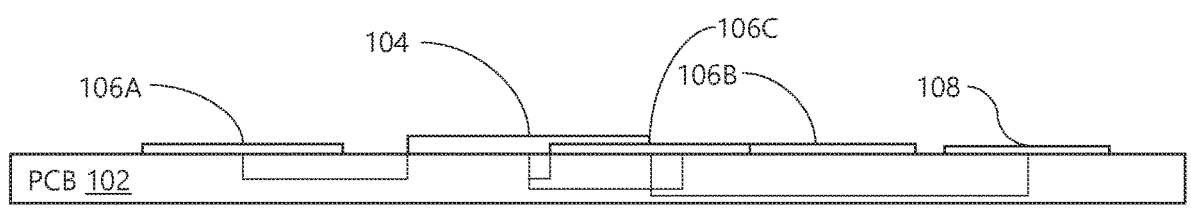

In some conventional circuit board designs, IC chips, power supply blocks, voltage regulating modules, clock chips, and other components are spread out in two dimensions across a printed circuit board (PCB). IC chips can be referred to as chips. The power and clock signal in such circuit board designs can be laterally delivered to the chip as illustrated in FIGS. 1A and 1B. A circuit assembly 100 comprises a printed circuit board 102. Disposed on the printed circuit board 102 are a chip 104, voltage regulating modules 106A-106C, and a clock circuit 108. To provide power and clock signals to the chip 104, power travels within the plane of the printed circuit board 102 from the voltage regulating modules 106A-106C to the chip 104 and from the clock circuit 108 to the chip 104. While voltage regulating modules are used in FIGS. 1A and 1B, it will be appreciated that other suitable electrical components may be used alternatively or additionally.

A layout as depicted in FIGS. 1A and 1B can result in relatively long delivery paths for power and clock signals. Long delivery paths (including both power supply and clock signals) can result in extra power loss to the system and introduce extra jitter to the clock signals. Thus, it can be advantageous to reduce and/or minimize the distance power and clock signals travel to reach a chip.

In accordance with aspects of the present application, a pair of crystal oscillators, which can provide differential reference clocks to on-chip phase locked loops, can be positioned orthogonal to an integrated circuit chip. This can be achieved by integrating the crystal chips into a power supply module that is positioned vertically relative to an integrated circuit chip. Such power supply modules can be underneath a system on a chip (SOC) and provide a power supply voltage vertically to a chip of an array of chips. The array of chips can be packaged using wafer-level chip scale packaging, fan-out wafer-level chip scale packaging, embedded interconnect bridging, or other array or multi-die packaging techniques. To ensure the clock signal has relatively low jitter and relatively low noise from other functional blocks integrated in the power supply module, technical solutions can be applied to provide a relatively stable power supply to the crystal oscillators and noise isolation along the clock signal transmission path.

Aspects of the present application can result in reducing or minimizing lateral signal routing as well as on-chip clock routing. In some cases, there can be no active buffering in such a path. Embodiments disclosed herein can result in reduced phase noise, which in turn can improve the on-chip computing and communication performance. The pitch between adjacent chips can be reduced and higher density for computing can be achieved with vertical clock delivery disclosed herein.

In some embodiments, a chip may be designed for use as part of a larger system. For example, a chip may be designed for artificial intelligence (AI) machine learning training, and chips may each be arranged as a computing block located in the middle and input/output (IO) blocks configured for chip-to-chip high speed communication may be disposed on the sides. The corners of the chip may contain various circuits, which can include clock circuits.

Figure 2:
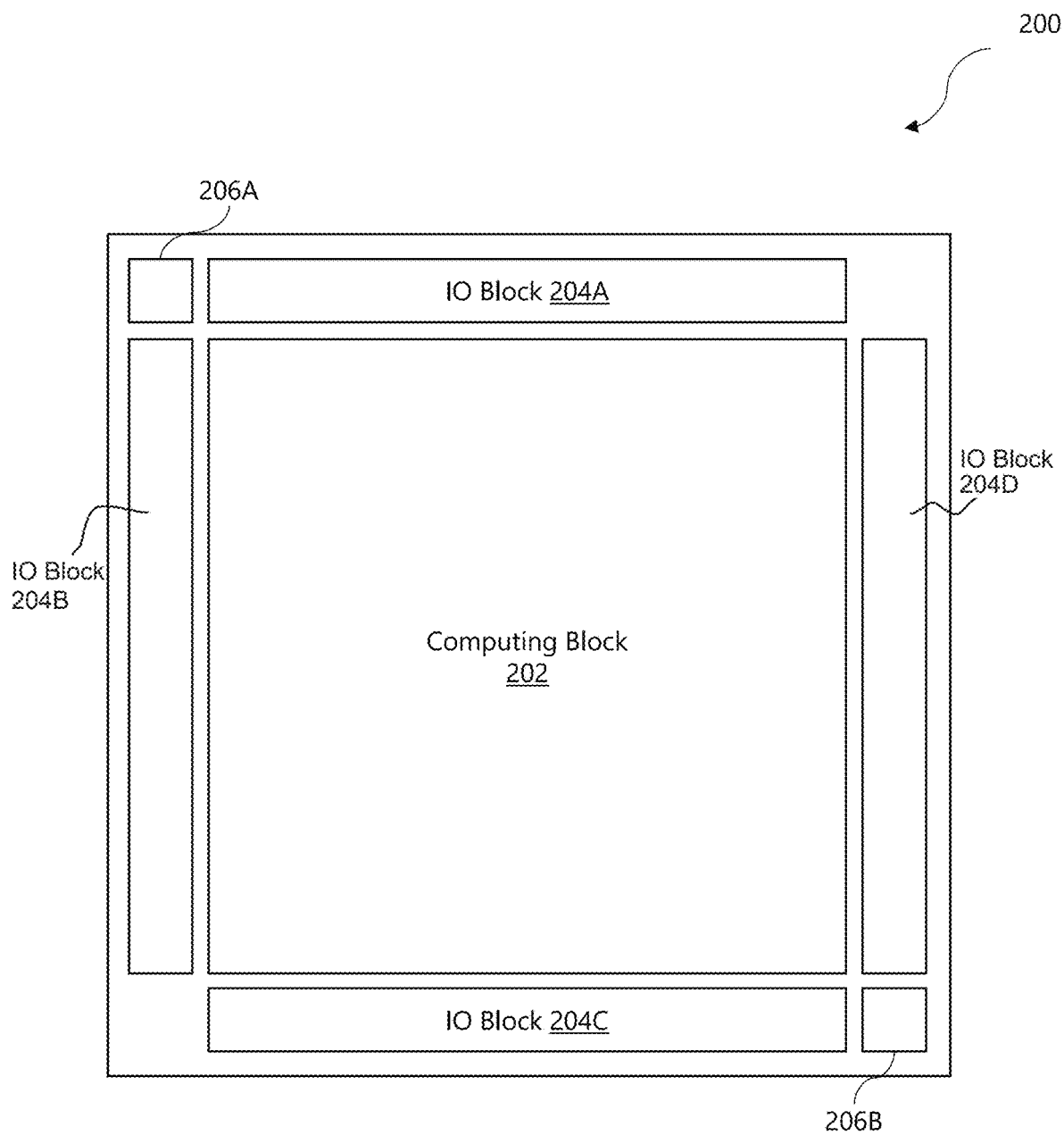
FIG. 2 depicts a chip according to embodiments described herein.

FIG. 2 depicts an example embodiment of a chip that may be used for AI machine training and/or other highly parallel or compute-intensive tasks. In FIG. 2, a chip 200 has a computing block 202 with IO blocks 204A, 204B, 204C, and 204D located along sides of the computing block 202. The IO blocks 204A, 204B, 204C, and 204D can interface with IO blocks of neighboring chips of an array of chips. In order to provide clock signals to the IO blocks 204A-204D, located on the four edges of the chip 200, there can be two clock signals provided to the chip 200 at clock signal contacts 206A and 206B, orthogonally placed at two diagonal corners as illustrated in FIG. 2. In some embodiments, a pair of crystal oscillators may be used to provide differential reference clocks. Clock signal contact 206A can support IO blocks 204A and 204B, and clock signal contact 206A can support the IO blocks 204C and 204D. The computing block 202 can receive one or more clock signals from the clock signal contact 206A and/or the clock signal contact 206B. The two orthogonal clock signal contacts 206A and 206B are provided to the chip to support a total of four edge IO blocks 204A-204D. Similarly, power may be supplied to the computing block 202, IO blocks 204A-204D on the four edges, and to any of the various circuits contained within the chip 200.

While the chip 200 is shown with four IO blocks 204 and two clock signal contacts 206A and 206B, other configurations are possible. For example, a chip may have one IO block, two IO blocks, three IO blocks, four IO blocks, or more. A chip may share a clock signal connection among two IO blocks, three IO blocks, four IO blocks, or more, for example all IO blocks in a chip, or the clock signal connection may not be shared (i.e., each IO block may have its own clock signal connection associated therewith).

Figure 3:
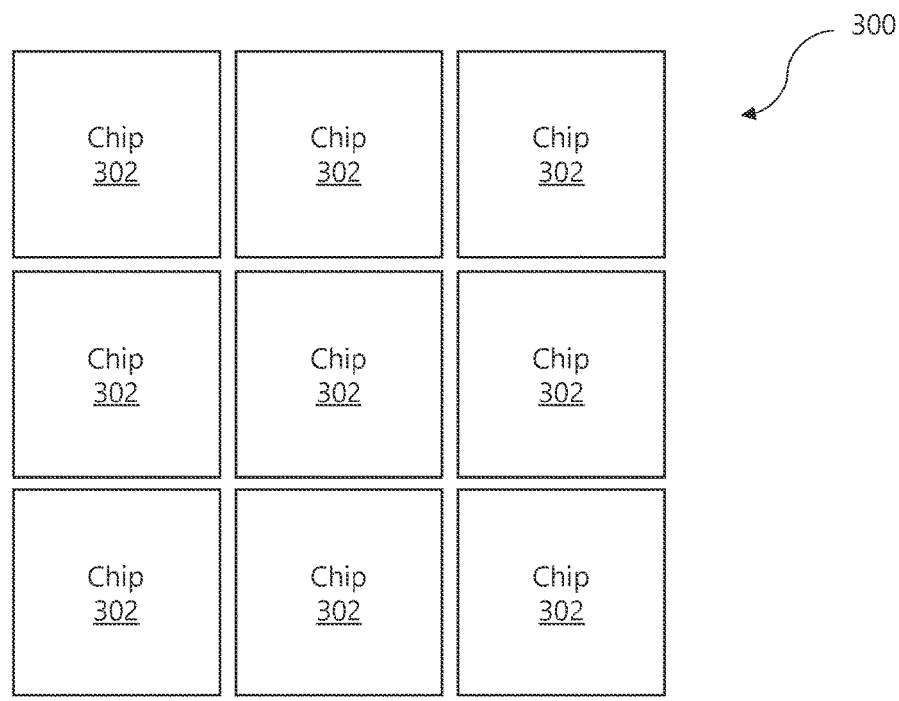
FIG. 3 depicts an array of chips according to embodiments described herein.

A chip can be an integrated circuit formed on a wafer. A chip, such as the chip 200 of FIG. 2, may be placed in an array arrangement with other chips (which may, in some embodiments, be identical) as depicted in FIG. 3, where an array 300 comprises a plurality of chips 302. A system on a wafer can include the array 300 of chips 302 and wafer level packaging. The array 300 includes chips 302 that are placed in close proximity to one another (e.g., directly next to or spaced with a small amount of space therebetween). The array 300 can provide a high compute density. Such an arrangement may be used to support AI machine training and/or other highly parallelized and/or compute intensive tasks. It can be advantageous for the power supply and clock signal for each chip in the array to be provided vertically because there may not be enough side area around each chip to support providing clock signals and/or power supply signals. Within the chip, the clock and power supply signals can be routed in a direction generally orthogonal to the direction in which they are received by the chip. For example, the signals can be received in a vertical direction and routed on chip generally in a direction that is perpendicular to the vertical delivery path.

Embodiments of this disclosure can provide a solution to technical problems associated with providing power and clock signals to chips arranged in an array, such as in FIG. 3. The clock signals and power supply signals may, instead of being providing horizontally, be provided vertically, for example from under or above the chips in the array. The vertically provided clock and power supply signals are provided orthogonally relative to a major surface of the chip. In some embodiments, the power delivery and clock signal circuits may be confined within an area about the same size or smaller than an individual chip in the array.

Figure 4:
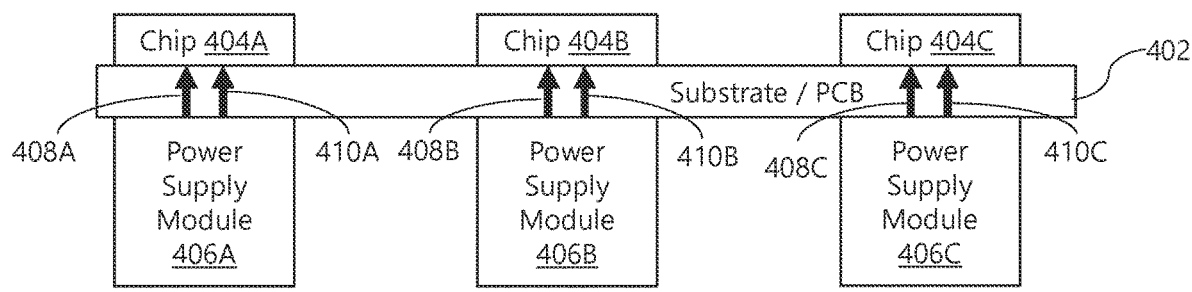
FIG. 4 is an illustration of a chip array with vertically-delivered power and clock signals according to some embodiments described herein.

FIG. 4 depicts a side view of an example embodiment of an array 400 with vertical power and clock signal delivery. The array 400 comprises chips 404A, 404B, and 404C disposed on a substrate or printed circuit board 402. On the opposite side of the substrate or printed circuit board 402, each of the chips 404A-404C may have an associated power supply module 406A-406C. The power supply modules 406A-406C can each include one or more crystal oscillators for generating a clock signal. For example, the power supply modules 406A-406C can each include a pair of crystal oscillators for generating a differential clock signal. The power supply modules 406A-406C can vertically deliver power supply signals, clock signals, or both to the chips 404A-404C. For example, as shown in FIG. 4, power signals 408A-408C and clock signals 410A-410C can be carried vertically from the power supply modules 406A-406C to the chips 404A-404C. The power signals 408A-408C and clock signals 410A-410C are provided by electrical connections that extend vertically from the power supply modules 406A-406C to the chips 404A-404C. The electrical connections can be implemented by pogo pins and/or other suitable vertical connectors. In some embodiments, the chips 404A-404C may be disposed on a printed circuit board (for example, singulated from a wafer and then mounted to a circuit board). In certain embodiments, the chips 404A-404C may be part of a system on a wafer (SoW) assembly. The SoW assembly can include wafer level packaging. In some such embodiments, a system on a wafer may be an integrated fan-out (InFO) wafer.

In addition to simplifying design by reducing the complex routing to route signals within the plane, vertical power and clock delivery can offer several other advantages. By vertically delivering power, the power losses that typically occur as signals travel laterally on a PCB may be significantly reduced due to shorter delivery paths and corresponding reduced resistance of the delivery paths. Such a reduction may not only reduce the direct current (DC) IR loss (e.g., the decrease in available voltage at the load device, such as a chip), but may also reduce the parasitic loop inductance associated with a current loop, thereby reducing the capacitance needed for circuit decoupling. Additionally, since the clock signal is also provided locally vertically, the shorter transmission length may reduce the jitter introduced in the signal as it is transmitted along the path and the noise coupled along the path. By delivering the clock and power signals vertically, rather than within the plane of the 2D chip array, the chip array may be made denser than if clock oscillator signals were to be routed between the dies. This configuration can also remove clock generators (e.g., crystals) from the area between dies, which can further reduce the chip array size, which can reduce power consumption (through reduced power delivery losses) and improve chip performance (through reduced clock jitter). Such vertically arranged block arrays may enable high computing density and high speed communication among the die of the array, which can be advantageous for AI machine learning applications and other applications where large compute power and high speed communication are significant advantages.

Example power supply modules are voltage regulating modules. Voltage regulating modules (VRMs) can be electrically noisy components. A VRM can covert a direct current voltage to a lower voltage level at a higher current to provide a power supply voltage for a chip. VRMs can receive a high voltage low current input and generate a high current low voltage output. VRMs can include one or a plurality of power conversion stages. The high current low voltage output can have a current on the order of 100s of Amperes and a voltage of under 1 Volt in certain applications. Typically, noise-sensitive clock signals and clock generators have been kept away from these blocks. However, in a vertical arrangement, and especially for a chip array, the voltage regulating circuitry may be relatively close to the clock circuitry. In some embodiments, a single-ended clock signal can be provided. However, a single-ended signal may be susceptible to interference. Accordingly, in some embodiments, a clock signal can be a differential signal provided by an LVDS pair. To handle the clock chip being placed next to or in close proximity to VRM blocks and address any resonance and/or noise from the switching in the VRMs, the LVDS pair may be kept as a current loop until it reaches the chip. The chip (or other components near the chip) can convert the LVDS pair to a voltage through an on-chip termination, for example, as depicted in FIG. 5.

Figure 5:
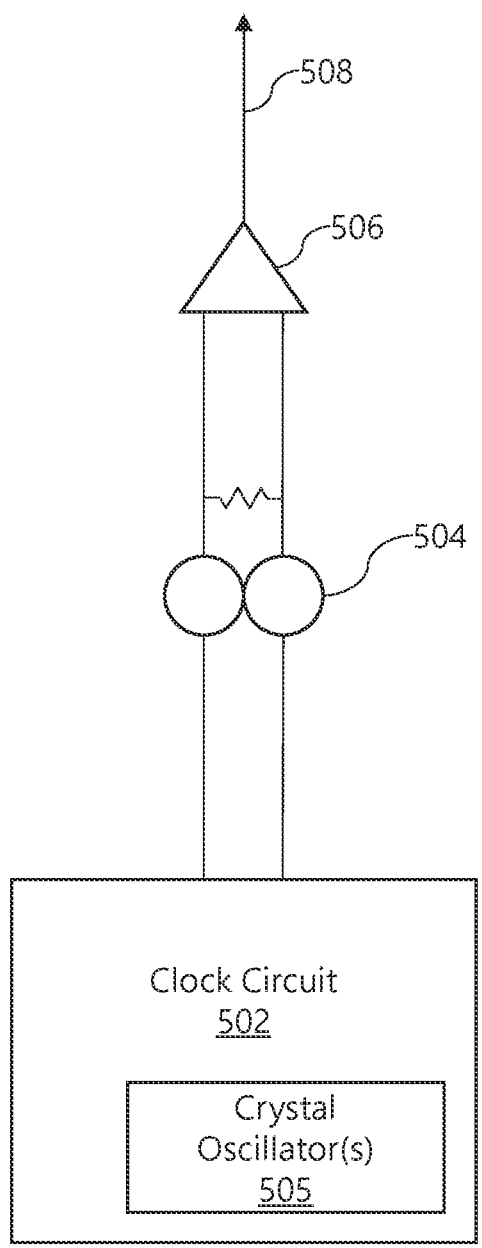
FIG. 5 is an example differential clock circuit according to some embodiments described herein.

As shown in FIG. 5, a clock circuit 502 can provide signals along an orthogonal route to a chip boundary 504 of a power delivery module. The clock circuit 502 can include at least one crystal oscillator 505 for generating a differential clock signal. The differential clock signal can be a LVDS signal. The differential clock signal can be converted to a single reference clock signal 508 by circuit element 506. The circuit element 506 can be, for example, an operational amplifier. This can generate a single-ended on-chip clock voltage signal. The LVDS current can be driven by a constant-current source from the clock chip and is less susceptible to coupling from neighboring wires.

Further, noise isolation technologies may be applied inside the voltage regulating module. Grounding vias may be placed around the clock differential pair via and a ground island may be used under the clock chip location. Additional noise filtering may also be used to keep the clock circuit power supply clean and to reduce or eliminate noise along the clock signal transmission path. Within a voltage regulating module, a clock signal can be electrically isolated from a power supply signal.

In some embodiments, a power delivery module can be configured to provide a power supply voltage and one or more clock signals to a chip of a chip array. The power supply module can be positioned vertically (e.g., above or below) the chip. In some embodiments, the power delivery module can include one or more clock generation circuits that can provide one or more clock signals from the power delivery module to the chip via one or more electrical connections extending vertically from the power delivery module to the chip.

In some embodiments, the power delivery module can be configured to provide a differential clock signal, as described in more detail above, and the chip can be configured to convert the differential signal to a single-ended signal. In some embodiments, the chip can route the power supply voltage and/or the clock signal in one or more directions that are substantially orthogonal to electrical connections used for providing the power supply voltage and/or the clock signals from the power delivery module to the chip. Accordingly, the on chip clock signal can mainly propagate perpendicularly in the chip relative to the direction the one or more clock signals propagate from the power delivery module to the chip. Similarly, the on chip power supply signal can mainly propagate perpendicularly in the chip relative to the direction the power supply signal propagate from the power delivery module to the chip.

Embodiments described herein may be used in and/or specifically configured for high performance computing and/or computationally intensive applications. For example, embodiments described herein may be configured for neural network training and/or processing, machine learning, artificial intelligence, or the like. Some embodiments described herein may be used for neural network training to generate data for use by an autonomous driving system for a vehicle (e.g., an automobile).

Additional Embodiments

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein may be modified or otherwise implemented in various other ways without departing from the spirit and scope of the disclosure. Accordingly, this description is to be considered as illustrative and is for the purpose of teaching those skilled in the art the manner of making and using various embodiments of the disclosed IC assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures may also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A computing system comprising:
   an array of chips comprising a chip; and
   a power delivery module configured to provide a power supply voltage and one or more clock signals to the chip, the power delivery module being positioned vertically relative to the chip, and the chip configured to vertically receive the one or more clock signals from the power delivery module, wherein the one or more clock signals comprise a differential signal.

2. The computing system of claim 1, wherein the chip comprises:
- a computing block;
- one or more input/output blocks;
- one or more clock signal contacts configured to receive the one or more clock signals from the power delivery module; and
- one or more power supply contacts configured to receive the power supply voltage from the power delivery module.

3. The computing system of claim 2, wherein the chip comprises at least two clock signal contacts.

4. The computing system of claim 1, wherein the one or more clock signals are electrically isolated from the power supply voltage within the power delivery module.

5. The computing system of claim 1, wherein the differential signal comprises a low voltage differential signaling clock signal.

6. The computing system of claim 1, wherein the chip is configured to convert the one or more clock signals from the differential signal to a single-ended voltage signal.

7. The computing system of claim 1, wherein the computing system is configured to train a neural network.

8. The computing system of claim 1, wherein the array of chips is included in a system on a wafer.

9. The computing system of claim 8, further comprising a plurality of additional power delivery modules, wherein the array of chips includes a plurality of additional chips, wherein each of the additional chips is aligned with and configured to vertically receive at least one clock signal from a respective one of the additional power delivery modules.

10. A computing system comprising:
- an array of chips comprising a chip; and
- a power delivery module configured to provide a power supply voltage and one or more clock signals to the chip, the power delivery module being positioned vertically relative to the chip, and the chip configured to vertically receive the one or more clock signals from the power delivery module, wherein the one or more clock signals are electrically isolated from the power supply voltage within the power delivery module using one or more grounding vias and a ground island.

11. A computing system comprising:
- an array of chips comprising a chip; and
- a power delivery module configured to provide a power supply voltage and one or more clock signals to the chip, the power delivery module being positioned vertically relative to the chip, and the chip configured to vertically receive the one or more clock signals from the power delivery module, wherein the power delivery module includes at least one crystal oscillator to generate the one or more clock signals.

12. The computing system of claim 11, wherein the one or more clock signals comprise a differential signal.

13. A computing system comprising:
- an array of chips comprising a chip; and
- a power delivery module comprising a crystal oscillator, the power delivery module configured to provide a power supply voltage and a low voltage differential signaling clock signal to the chip, the power delivery module being positioned vertically relative to the chip, and the chip configured to vertically receive the low voltage differential signaling clock signal from the power delivery module,
- wherein the chip is configured to convert the low voltage differential signaling clock signal to a single-ended signal, and
- wherein the array of chips is included in a system on a wafer.

14. A method of clock delivery, the method comprising:
- generating, using at least one crystal oscillator of a power delivery module, one or more clock signals with the power delivery module that provides a power supply voltage to a chip of a chip array, wherein the power delivery module is positioned vertically relative to the chip; and
- providing the one or more clock signals from the power delivery module to the chip via one or more electrical connections that extend vertically from the power delivery module to the chip.

15. A method of clock delivery, the method comprising:
- generating one or more clock signals with a power delivery module that provides a power supply voltage to a chip of a chip array, wherein the power delivery module is positioned vertically relative to the chip; and
- providing the one or more clock signals from the power delivery module to the chip via one or more electrical connections that extend vertically from the power delivery module to the chip,
- wherein the one or more clock signals comprise a differential clock signal, and the method further comprises converting, by the chip, the differential clock signal to a single-ended clock signal.

16. The method of claim 15, further comprising routing the single-ended clock signal within the chip in one or more directions that are generally perpendicular to the one or more electrical connections.

17. The method of claim 16, wherein the differential clock signal is low voltage differential signaling clock signal.

18. The method of claim 15, wherein the generating is performed using at least one crystal oscillator of the power delivery module.

19. The method of claim 14, wherein the chip array is included on a system on a wafer.

20. The method of claim 14, wherein the providing comprises providing the one or more clock signals to at least two clock contacts of the chip.

* * * * *